C. W. DUERRSTEIN.
AUTOMOBILE RUNNING GEAR.
APPLICATION FILED JUNE 20, 1911.
1,064,623.
Patented June 10, 1913.
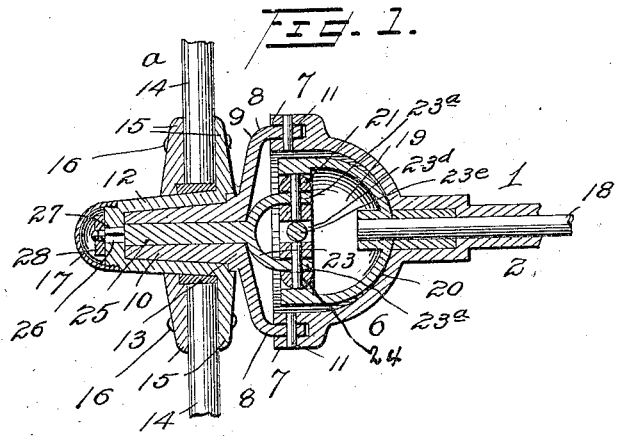
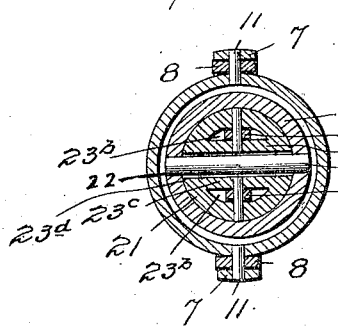
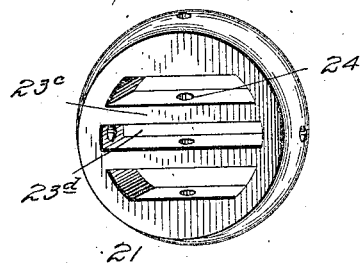
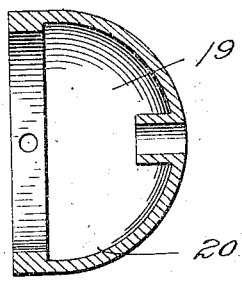
Inventor
Christian W. Duerrstein
Witnesses
By Victor J. Evans
Attorney

UNITED STATES PATENT OFFICE.

CHRISTIAN W. DUERRSTEIN, OF GUILFORD, ILLINOIS.

AUTOMOBILE RUNNING-GEAR.

1,064,623.

Specification of Letters Patent. Patented June 10, 1913.

Application filed June 20, 1911. Serial No. 634,229.

*To all whom it may concern:*

Be it known that I, CHRISTIAN W. DUERRSTEIN, a citizen of the United States, residing at Guilford, in the county of Jo Daviess and State of Illinois, have invented new and useful Improvements in Automobile Running-Gears, of which the following is a specification.

This invention relates to certain novel and useful improvements in motor vehicle running gear.

In carrying out my invention, it is my purpose to provide a simple and efficient form of running gear which is applicable for use in connection with all types and styles of motor vehicles, from the largest transportation trucks to small passenger vehicles.

Still a further object of the invention is to provide an improved running gear which will increase the frictional contact of the wheels with the ground and thereby diminish the liability of the machine skidding.

With the above recited objects and others of a similar nature in view, the invention consists in the construction, combination and arrangement of parts, set forth in and falling within the scope of the appended claim.

In the accompanying drawing Figure 1 is an enlarged detail sectional view of the knuckle and a portion of the end of one of the axles and also illustrating the construction of the hub securing the spokes of the wheel. Fig. 2 is a vertical sectional view, taken through the knuckle on the line 4—4 of Fig. 3. Fig. 3 is a detail perspective view of the ring of the knuckle to which the swiveled end of the axle is connected. Fig. 4 is a detail sectional view of the cup bearing carried by the tubular sleeve of the front shaft.

Referring now to the accompanying drawings in detail, the letter *a* indicates the forward wheel of a motor driven vehicle, while the numeral 1 designates the tubular front axle. As both ends of the forward axle are of similar construction, it is thought that a showing and description of one of such ends will suffice for both. Each end of the front axle is provided with an enlarged cup-member 6 formed with perforated lugs 7 between which and the body of the cup, the ends 8, 8 of the yoke 9 of the axle 10 are inserted, while 11 indicates bolts or pins adapted to connect the yoke to the lugs, thus, it will be seen that the axle at its ends is provided with a pivoted section.

12 designates the hub of the wheel which is tapered inwardly toward its enlarged end 13 to conform to the taper of the axle skein, while 14 designates the spokes of the wheel held in position by means of the circular plate 15—15, while 16 indicates the bolts for the spokes and 17 is a cap at the end of the axle. The front drive shaft of the machine is shown at 18 and extends through the tubular axle, said shaft at each of its ends being provided with an oil cup 19, designed to lie within the adjacent cup of the axle, said oil cup being preferably swelled as at 20 for the reception of a quantity of oil.

21 designates a ring swiveled at 22 within the oil cup while 23 indicates a yoke having the arms $23^a$ extended into the slots $23^b$ formed between the sides of the ring and the central bar $23^c$, the latter being slotted longitudinally as at $23^d$ for the passage of the swiveled pin $23^e$ or other means by which the ring is swiveled in the cup, the ends of the arms of the yoke being pivoted at 24 to the ring, said yoke being formed at one end of the shaft 25, which thus forms a continuation of the power shaft through the universal joint just described, the end of said shaft 25 being square in cross section as at 26 and projected through the rectangular recess 27 in the end of the hub, while 28 is a nut threaded onto the end of the shaft 25.

It will be seen that I have provided an efficient form of running gear which is adaptable for all types of motor vehicles and while I have herein shown and described one particular embodiment of my invention by way of illustration, I wish it to be understood that I do not confine myself to all the precise details of construction as herein set forth, as modification and variation may be made without departing from the spirit of the invention or exceeding the scope of the appended claim.

I claim:—

In a vehicle running gear, the combination with a front axle, of a cup carried at the end of the axle, a shaft extending through the axle, a cup at the end of the shaft and disposed within the first-mentioned cup, a ring within the last-mentioned cup and provided with a plurality of spaced parallel bars, a yoke swiveled to the bars, a swivel pin passing through the said ring and disposed between the bars and a terminating in the inner cup member, and a shaft connected to the yoke and projecting through an opening in the skein of the axle.

In testimony whereof I affix my signature in presence of two witnesses.

CHRISTIAN W. DUERRSTEIN.

Witnesses:
 FRANK T. SHEEAN,
 THOS. J. SHEEAN.